United States Patent
Inagaki

(10) Patent No.: US 6,665,097 B1
(45) Date of Patent: Dec. 16, 2003

(54) IMAGE READING APPARATUS

(75) Inventor: Yoshihiro Inagaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/537,674

(22) Filed: Mar. 29, 2000

(30) Foreign Application Priority Data

Mar. 31, 1999 (JP) .......................................... 11-090914

(51) Int. Cl.$^7$ ............................. H04N 1/40; H04N 1/04; G02B 27/40; G01J 1/36
(52) U.S. Cl. .................. 358/471; 358/474; 358/497; 250/201.2; 250/204
(58) Field of Search ................. 358/475, 406, 358/471, 497, 474; 356/72; 250/234, 201.2, 204

(56) References Cited

U.S. PATENT DOCUMENTS 4,557,593 A  * 12/1985  Iwanade ...................... 355/57
5,144,356 A  *  9/1992  Kurbitz et al. ................. 396/97
5,436,692 A  *  7/1995  Noguchi ....................... 355/53

FOREIGN PATENT DOCUMENTS

JP    5-236267    9/1993
JP    5-276331    10/1993

* cited by examiner

Primary Examiner—Edward Coles
Assistant Examiner—Jason Sherrill
(74) Attorney, Agent, or Firm—McDermott, Will & Emery

(57) ABSTRACT

When sequentially reading a plurality of documents in an image reading apparatus using, for example, an automatic document feeder, the temperature inside the apparatus rises and the refractive index of a lens or the like in an optical system changes, causing focus and magnification errors. To address this, focus and magnification adjustments are made by reading a chart when a document reading operation is not being performed. On the other hand, during a document reading operation, the temperature inside the apparatus, especially, the temperature of the lens, is measured, and the focus and magnification are adjusted based on the measured temperature.

15 Claims, 10 Drawing Sheets

IMAGE READING APPARATUS

RELATED APPLICATIONS

The present application claims priority to Japanese Patent Application No. 11-90914 filed Mar. 31, 1999, the content of which is hereby incorporated by reference.

BACKGROUND OF THE INVENTION

1. Field of the Invention

The present invention relates to an adjusting device for use in an image reading apparatus, and more particularly to an adjusting device used in an image reading apparatus for adjusting the state of focus and the optical magnification factor in an imaging section of the image reading apparatus.

2. Description of the Related Art

It has been known heretofore to provide an image reading apparatus which scans a reading target by illuminating it with light and which reads the reflected light as image information. A device for detecting the state of focus in an imaging section of such an image reading apparatus is disclosed, for example, in Japanese Unexamined Patent Publication No. 5-276331. This device detects the state of focus by reading a ladder chart by means of a reader.

In an image reading apparatus, an automatic document feeder is used to sequentially read a plurality of documents. During such sequential document reading, the temperature inside the apparatus rises and the refractive index of a lens or the like in an optical system changes, causing focus and magnification errors. The prior art, however, has had the problem that, to detect such focus or magnification errors, the sequential document reading operation must be stopped temporarily and the reading of the chart, etc. must be performed once again.

SUMMARY OF THE INVENTION

An object of the present invention is to solve the above problem.

A further object of the present invention is to provide an adjusting device for use in an image reading apparatus that can easily adjust the state of focus and the optical magnification factor.

These and other objects are achieved by an image reading apparatus, comprising: an image sensor; an optical system for exposing a reading target to light, and for projecting image light of the reading target onto an image sensor; a temperature sensor for measuring temperature inside the apparatus; an adjusting mechanism for adjusting at least either a state of focus or a reading magnification factor on the image sensor; and a control circuit for controlling the adjusting mechanism to make the adjustment based on the temperature measured by the temperature sensor.

In this image reading apparatus, since at least either the state of focus or the reading magnification factor is adjusted based on the measured temperature, the adjustment can be made easily.

Preferably, a detection means is provided for detecting at least either the state of focus or the reading magnification factor on the image sensor by using a chart, wherein during sequential reading of reading targets, the adjustment is made using the adjusting mechanism, and at other times, the adjustment is made based on the result of the detection from the detection means.

According to the present invention, since, during the sequential reading of the reading targets, the adjustment is made based on the measured temperature, it becomes possible to provide an image reading apparatus that allows the adjustment to be made without having to interrupt the reading operation in progress.

Preferably, the adjusting mechanism moves the image sensor or part of the optical system. Also preferably, the adjusting mechanism makes the adjustment based on the temperature at the time that the image sensor starts reading and on the measured temperature.

It is preferable that the temperature sensor is provided in close proximity to an optical element having the highest refractive power in the optical system. When the temperature sensor is thus provided in close proximity to the optical element having the highest refractive index in the scanning optical system, the adjustment can be made with higher accuracy.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
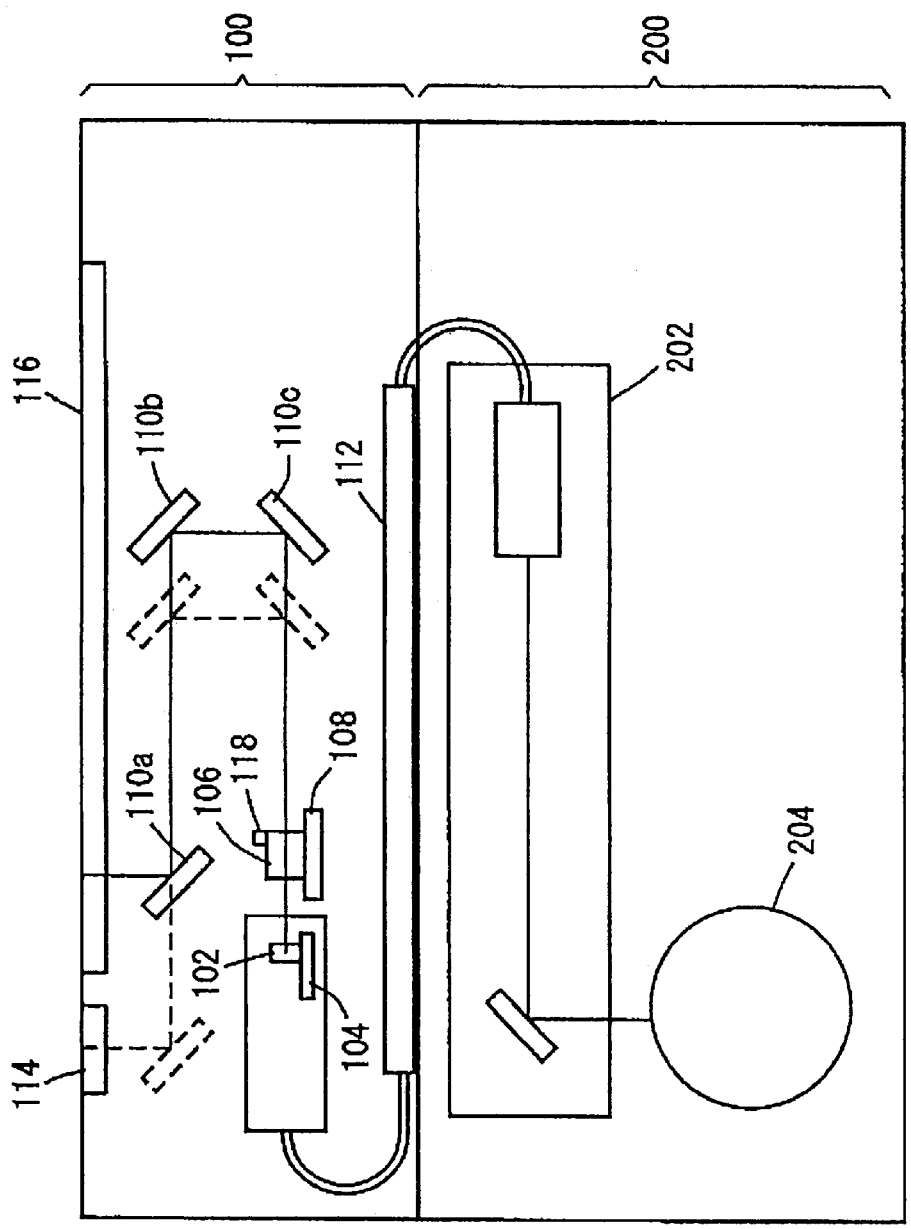
FIG. 1 is a cross sectional view showing the construction of a digital copying machine according to one embodiment of the present invention.

FIG. 1 is a cross sectional view showing the construction of a digital copying machine according to one embodiment of the present invention.

The digital copying machine consists essentially of an image reading apparatus 100 and an image forming apparatus 200.

The image reading apparatus 100 comprises: a document glass 116 for mounting a document thereon; scanning mirrors 110a to 110c for reflecting light reflected from the document; a lens 106 for focusing the light reflected from the scanning mirror 110c; a CCD 102 for receiving the light passed through the lens 106; an image processing device 112 for processing signals from the CCD 102; a CCD fine adjusting mechanism 104 for moving the position of the CCD 102; a lens fine adjusting mechanism 108 for moving the position of the lens 106; and an adjusting chart 114 used for focus adjustment and the measurement of the reading magnification. When reading the adjusting chart 114, the scanning mirrors 110a to 110c are moved from the positions indicated by solid lines to the positions indicated by dotted lines.

The image forming apparatus 200 comprises a print head 202 which outputs a laser beam by receiving a signal from the image processing device 112, and a photoconductor 204 on which an electrostatic latent image is formed by exposure to the laser beam emitted from the print head 202.

The image reading apparatus 100 further includes a temperature sensor 118 which is disposed in close proximity to the lens 106 (the optical element having the highest refractive index in the scanning optical system). The temperature sensor 118 measures the temperature inside the apparatus (especially, the temperature of the lens 106).

Figure 2:
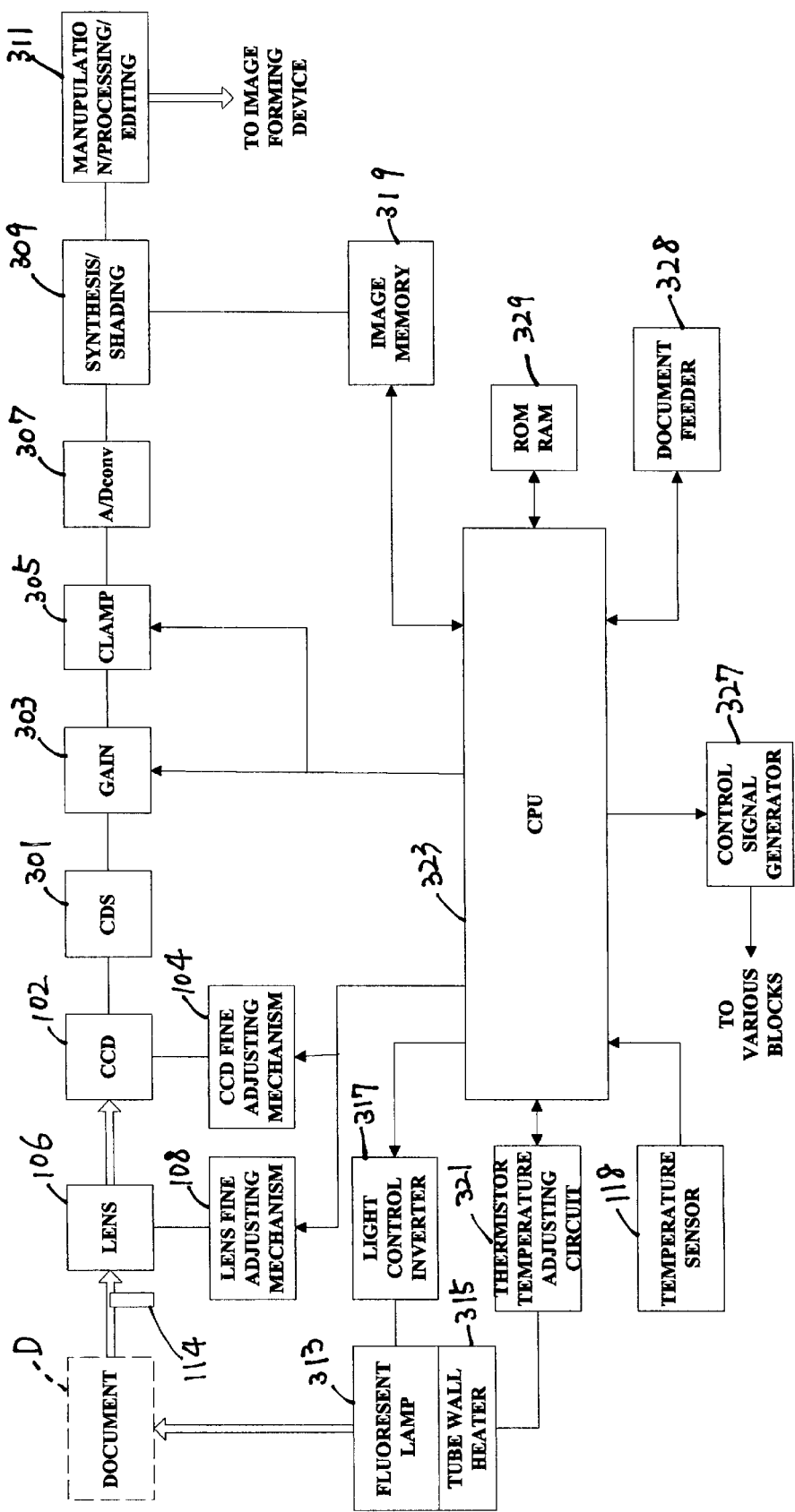
FIG. 2 is a block diagram showing the circuit configuration of the digital copying machine.

FIG. 2 is a block diagram showing the circuit configuration of the digital copying machine of FIG. 1. Referring to the figure, the digital copying machine comprises: the CCD 102 for reading the light reflected from the document D through the lens 106; a CDS section 301 for performing correlated double sampling (CDS) on the output of the CCD 102; a gain circuit 303; a clamp circuit 305; an A/D converter 307 for converting an analog signal fed from the clamp circuit 305 into a digital signal; an output synthesis/ shading correction section 309 for applying synthesis or shading correction operations to the output from the A/D converter 307; an image manipulation/processing/editing section 311 for applying manipulation, processing, or editing operations to a signal fed from the output synthesis/ shading correction section 309; a fluorescent lamp 313 for illuminating the document D; a light controlling inverter 317 connected to the fluorescent lamp 313; a tube wall heater 315 for heating the fluorescent lamp 313; a thermistor temperature adjusting circuit 321; a CPU 323 for controlling the entire operation of the apparatus; an image memory section 319 for temporarily storing an image output from the output synthesis/shading correction section 309; a ROM/ RAM 325 for storing a program and providing a work area during the execution of the program; and a control signal generator (CCD accumulation time generator) 327 for generating control signals to various blocks.

The lens fine adjusting mechanism 108 and the CCD fine adjusting mechanism 104 are connected to the lens 106 and the CCD 102, respectively, and are driven by signals issued from the CPU 323.

The signal from the temperature sensor 118 is supplied to the CPU 323. A document feeder 328 for feeding documents when sequentially reading a plurality of documents is connected to the CPU 323.

Figure 3:
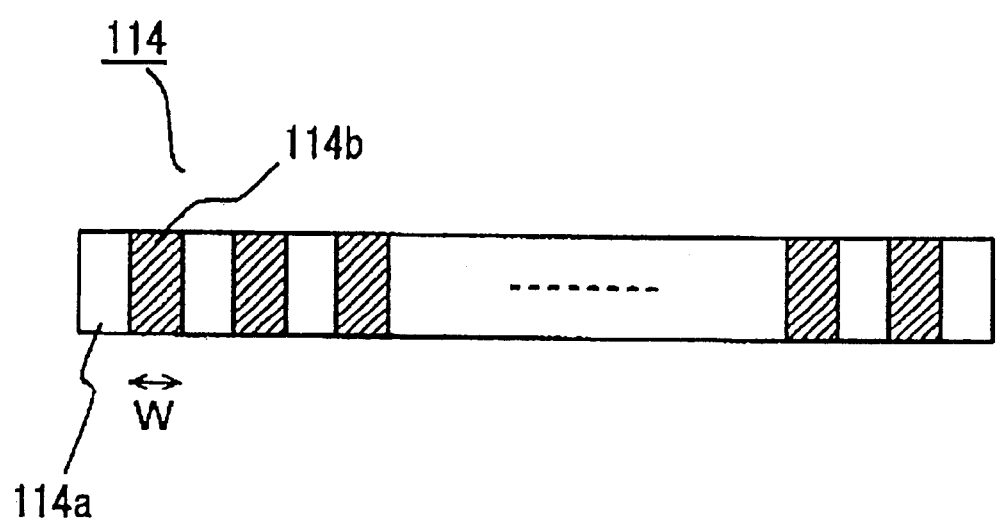
FIG. 3 is a plan view of an adjusting chart 114.

FIG. 3 is a plan view of the adjusting chart 114. As shown, the adjusting chart 114 is a ladder chart consisting of white bars 114a and black bars 114b arranged in alternating fashion. The reading magnification factor in the image reading apparatus can be measured by counting the number of pixels, W, along the width of any particular black bar 114b in the image ready by the CCD 102. Furthermore, by reading this adjusting chart 114, the state of focus, and the amount of focus error can be detected.

Figure 4:
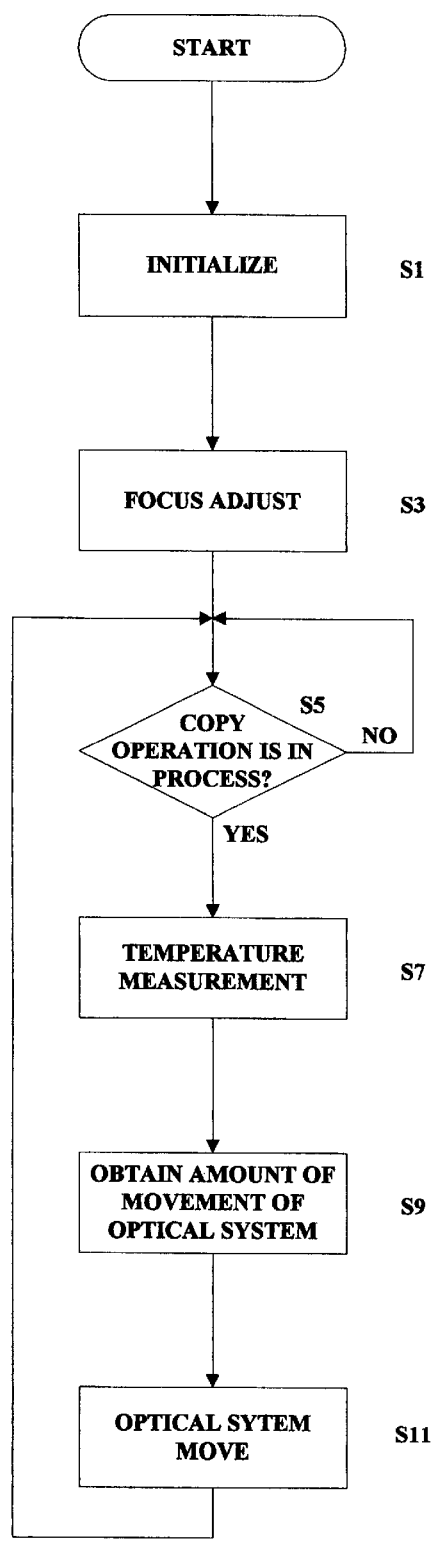
FIG. 4 is a flowchart illustrating the sequence of adjusting operations performed in the digital copying machine.

FIG. 4 is a flowchart illustrating the sequence of focus adjusting operations performed in the digital copying machine.

Referring to the figure, the initial setting is done in step S1. In step S3, the CCD 102 reads the adjusting chart 114 to measure the reading magnification factor of the optical system. At this time, the state of focus and the amount of focus error are also measured. Based on the reading magnification factor and the amount of focus error thus measured, the optical system is adjusted using the CCD fine adjusting mechanism 104 and the lens fine adjusting mechanism 108.

In step S5, it is determined whether a copying operation is in progress or not, and the process waits until a YES result is yielded.

When a YES result is yielded in step S5, the process proceeds to step S7 where the temperature is measured by the temperature sensor 118. Next, in step S9, the amount of movement of the optical system is obtained by reference to a table based on the measured temperature, and in step S11, based on the amount of movement thus obtained, the CCD 102 and the lens 106 are moved by means of the CCD fine adjusting mechanism 104 and the lens fine adjusting mechanism 108, respectively.

After the processing in step S11, the process returns to the processing in step S5.

Figure 5:
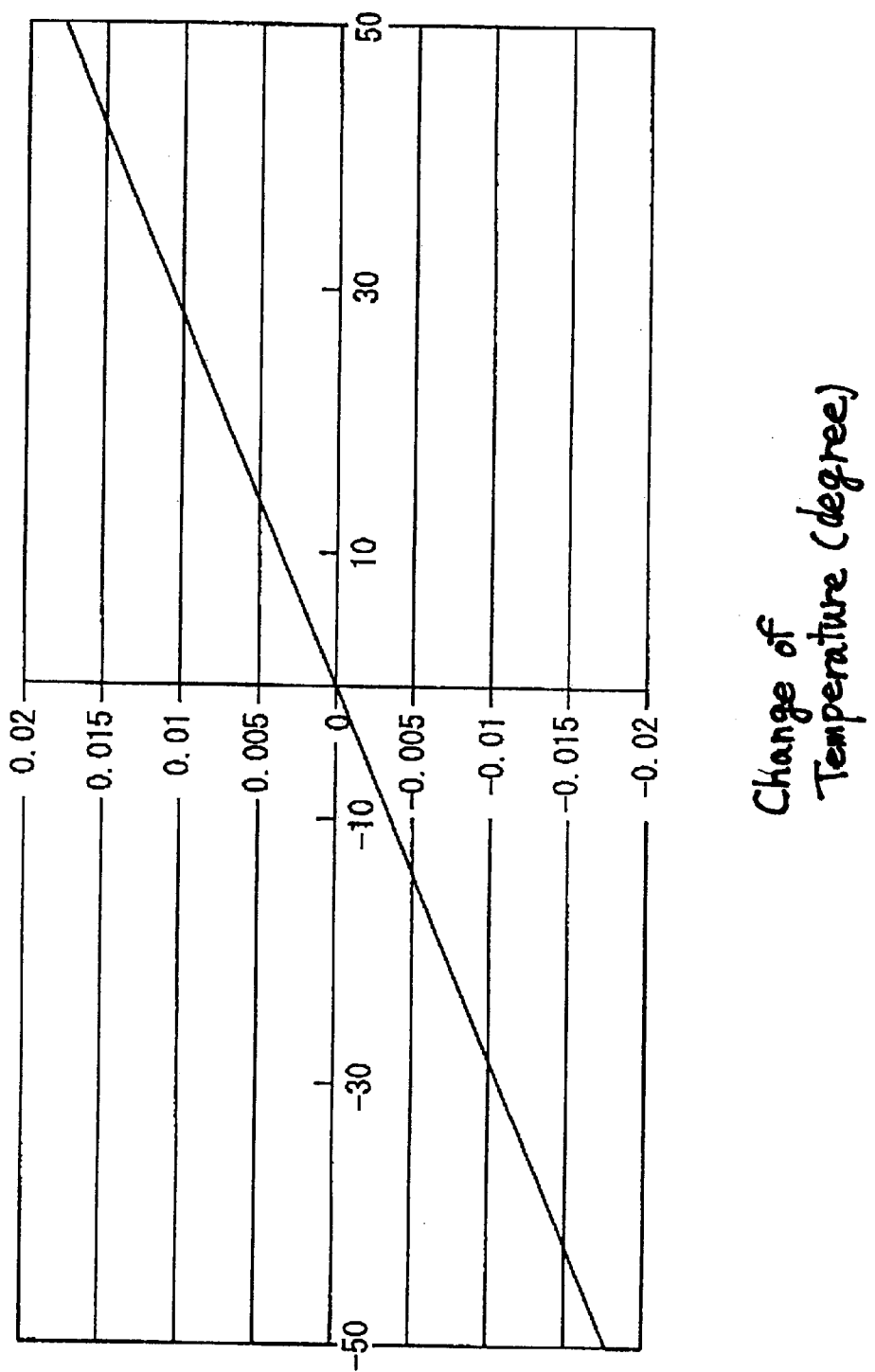
FIG. 5 is a diagram showing the relationship between the amount of magnification error and the amount of change of temperature.

FIG. 5 is a graph showing the relationship between the amount of magnification error (mm) and the amount of change of temperature (degrees). As shown, since the amount of magnification error is a linear function of the amount of change of temperature, the amount of magnification error can be determined by measuring the temperature with the temperature sensor 118.

Figure 6:
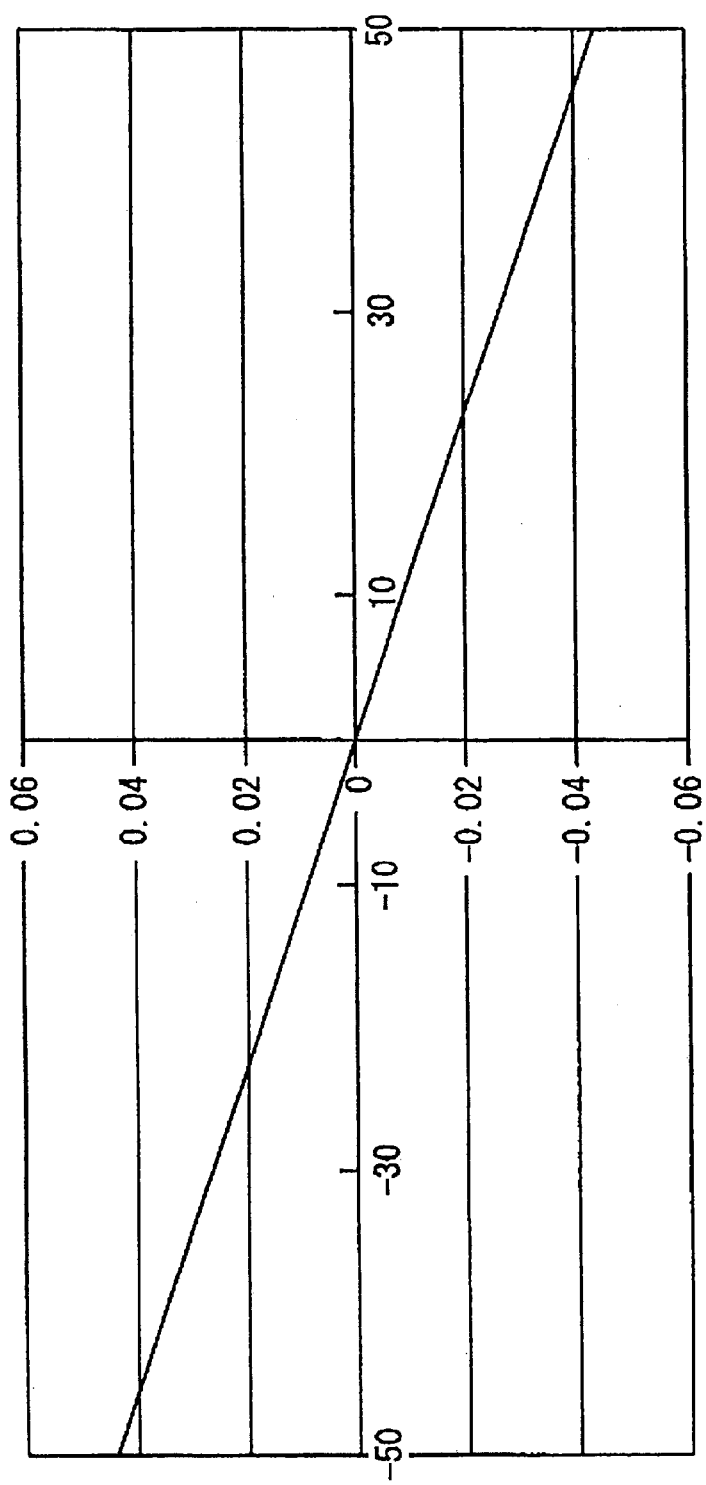
FIG. 6 is a diagram showing the relationship between the amount of focus error and the amount of change of temperature.

Similarly, as shown in FIG. 6, the amount of focus error (mm) is a linear function of the amount of change of temperature (degrees). Accordingly, the amount of focus error can be determined based on the temperature.

Figure 7:
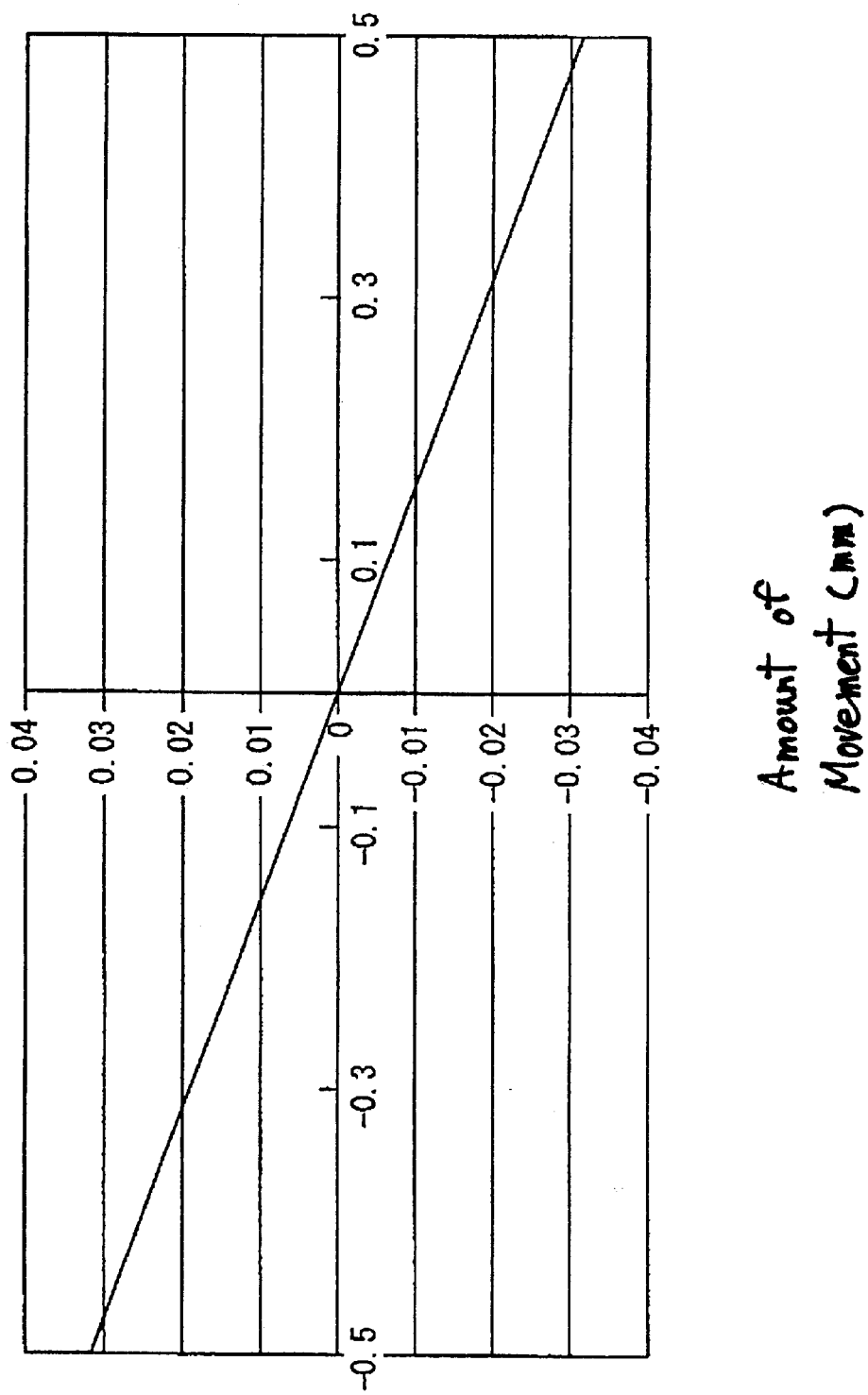
FIG. 7 is a diagram showing the relationship between the amount of magnification error and the amount of lens and CCD movement.
Figure 8:
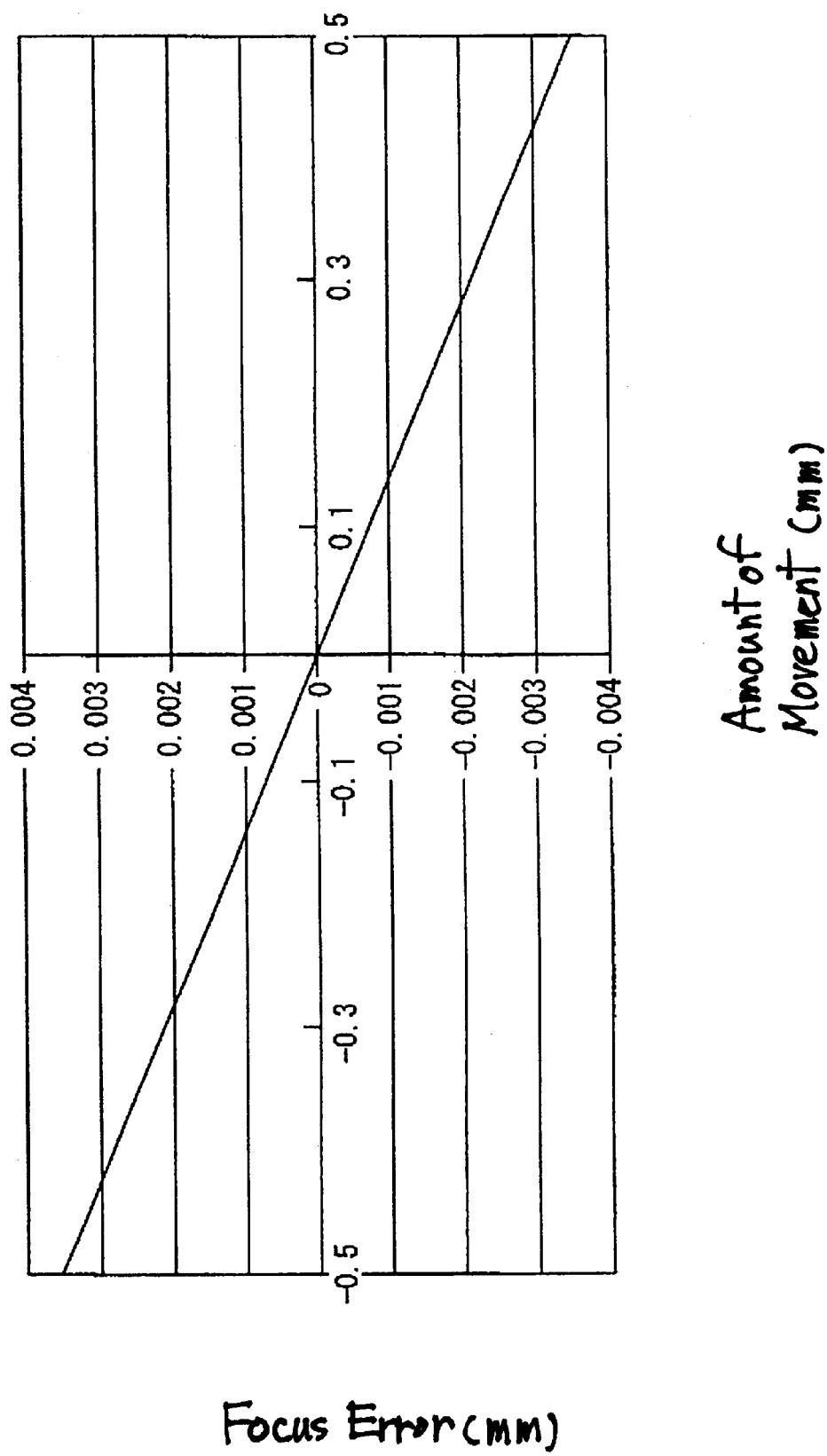
FIG. 8 is a diagram showing the relationship between the amount of focus error and the amount of lens and CCD movement.

FIG. 7 is a graph showing the relationship between the amount of magnification error (mm) and the amount of movement (mm) of the optical system, and FIG. 8 is a graph showing the relationship between the amount of focus error (mm) and the amount of movement (mm) of the optical system.

Based on the measured amount of change of temperature, magnification and focus errors are detected using the graphs shown in FIGS. 5 and 6, respectively. Likewise, the amount of movement of the optical system is determined using the graphs shown in FIGS. 7 and 8. By moving the lens 106 and the CCD 102 so as to correct for the magnification and focus errors based on the thus determined amount of movement of the optical system, the magnification and focus errors can be corrected without having to read the chart.

Accordingly, there is no need to stop the reading operation during the sequential reading of reading targets.

In present embodiment, both the state of focus and the optical magnification factor are adjusted, but provisions may be made so that at least one or the other of them is adjusted.

Further, in the processing in step S9 for determining the amount of movement of the optical system, the amount of movement may be determined based on the temperature at the start of the copy operation (sequential reading) and on the measured temperature.

In the above embodiment, the lens 106 and the CCD 102 are moved at the same time, but it will be recognized that magnification and focus errors can also be corrected by moving only the CCD 102.

Figure 9:
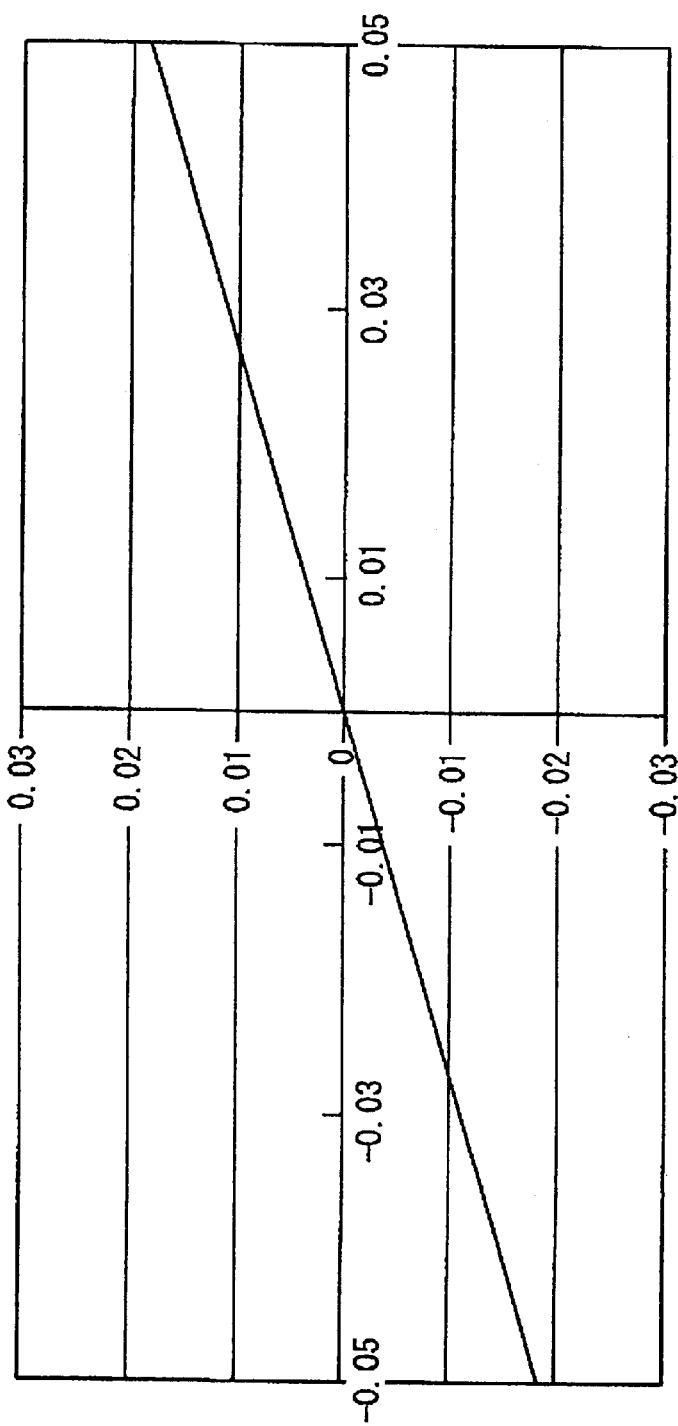
FIG. 9 is a diagram showing the relationship between the amount of magnification error and the amount of CCD movement.
Figure 10:
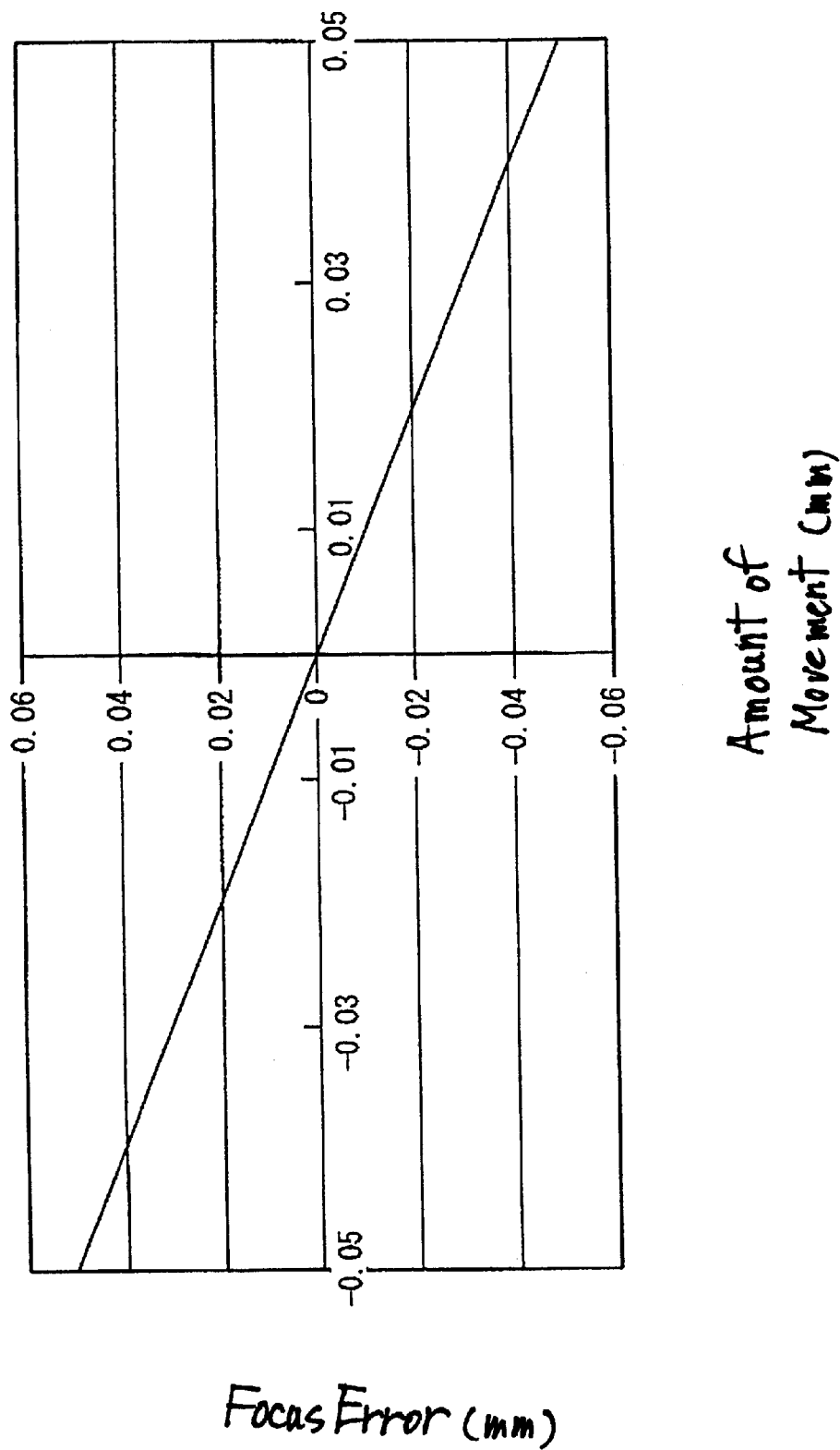
FIG. 10 is a diagram showing the relationship between the amount of focus error and the amount of CCD movement.

FIG. 9 is a diagram showing the relationship between the amount of magnification error (mm) and the amount of movement (mm) when only the CCD 102 is moved. Likewise, FIG. 10 is a diagram showing the relationship between the amount of focus error (mm) and the amount of movement (mm) when only the CCD 102 is moved. The adjustment may be made based on these relationships.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image reading apparatus, comprising:
   an image sensor;
   an optical system for exposing a reading target document to light, and for projecting image light of the reading target document onto said image sensor;
   a temperature sensor for measuring temperature inside the apparatus;
   an adjusting mechanism for adjusting a state of focus on said image sensor; and
   a control circuit for controlling said adjusting mechanism to make the adjustment based on the temperature measured by said temperature sensor.

2. An image reading apparatus according to claim 1, wherein said adjusting mechanism adjusts during said image sensor read images.

3. An image reading apparatus according to claim 1, wherein said adjusting mechanism moves said optical system.

4. An image forming apparatus according to claim 1, wherein said temperature sensor is provided in close proximity to an optical element having the highest refractive power in said optical system.

5. An image forming apparatus according to claim 1, further comprising:
   an adjusting chart; and
   a focus adjusting device which adjusts the state of focus on said image sensor based on the result of the reading said adjusting chart by said image sensor.

6. An image reading apparatus, comprising:
   an image sensor;
   an optical system for exposing a reading target document to light, and for projecting image light of the reading target document onto said image sensor;
   a temperature sensor for measuring temperature inside the apparatus;
   an adjusting mechanism for adjusting a reading magnification factor on said image sensor; and
   a control circuit for controlling said adjusting mechanism to make the adjustment based on the temperature measured by said temperature sensor.

7. An image reading apparatus according to claim 6, wherein said adjusting mechanism adjusts during said image sensor read images.

8. An image reading apparatus according to claim 6, wherein said adjusting mechanism moves said optical system.

9. An image forming apparatus according to claim 6, wherein said temperature sensor is provided in close proximity to an optical element having the highest refractive power in said optical system.

10. An image forming apparatus according to claim 6, further comprising:
    an adjusting chart; and
    a focus adjusting device which adjusts the reading magnification factor on said image sensor based on the result of the reading said adjusting chart by said image sensor.

11. An image reading apparatus, comprising:
    an image reading device for scanning a reading target, and for reading an image of the reading target;
    a temperature sensor for measuring temperature inside the apparatus; and
    an adjusting mechanism for adjusting at least either a state of focus or a reading magnification factor on the image reading device based on the temperature measured by said temperature sensor.

12. An image reading apparatus, comprising:
    an image sensor;
    an optical system for exposing a reading target document to light, and for projecting image light of the reading target document onto said image sensor;
    an adjusting chart;
    a temperature sensor for measuring temperature inside the apparatus;
    an adjusting mechanism which adjusts at lease either a state of focus or a reading magnification factor on said image sensor; and
    a control circuit which controls said adjusting mechanism to adjust based on the result of the reading said adjusting chart by said image sensor when a target reading operation is not being performed and to adjust based on the temperature measured by said temperature sensor during the target reading operation.

13. An image reading apparatus according to claim 12, wherein said adjusting mechanism adjusts based on the temperature at the time that said image sensor starts reading and on the measured temperature.

14. An image reading apparatus according to claim 12, wherein said adjusting mechanism moves a part of said optical system.

15. An image reading apparatus according to claim 12, wherein said temperature sensor is provided in close proximity to an optical element having the highest refractive power in said optical system.

* * * * *